United States Patent
Hood

[15] 3,656,511
[45] Apr. 18, 1972

[54] CONTROL APPARATUS FOR AUTOMATIC WATER FLUSHING SYSTEMS

[72] Inventor: Graham Frank Hood, 2 Halls Road, Biddulph, Stoke-on-Trent, England

[22] Filed: Aug. 17, 1970

[21] Appl. No.: 64,287

[30] Foreign Application Priority Data

Aug. 21, 1969 Great Britain......................41,698/69

[52] U.S. Cl............................................137/624.11, 4/101
[51] Int. Cl..............................................................E03b
[58] Field of Search...................137/624.11, 624.13, 624.18, 137/613; 4/101, 100

[56] References Cited

UNITED STATES PATENTS 2,908,017  10/1959  Whaley..................................4/101 X Primary Examiner—Alan Cohan
Attorney—Breitenfeld & Levine

[57] ABSTRACT

The flow of water to a system comprising one or a number of automatically operated flushing cisterns is subject to the control of apparatus fitted on a pipe line leading from a water supply main to the flushing system, the control apparatus comprising a passage through which the water must flow on its way from the main to the system, a valve controlling the flow through the passage, a spring acting to hold the valve normally in an open position, a solenoid device which when energized acts to overcome the action of the spring and close the valve, thereby shutting off the flow of water to the system, and a timing device programming the energization of the solenoid device and governing the periods when the valve will be closed and the water supply to the system shut off, so as to obviate waste of water by unwanted automatic flushing action during off periods.

1 Claims, 1 Drawing Figure

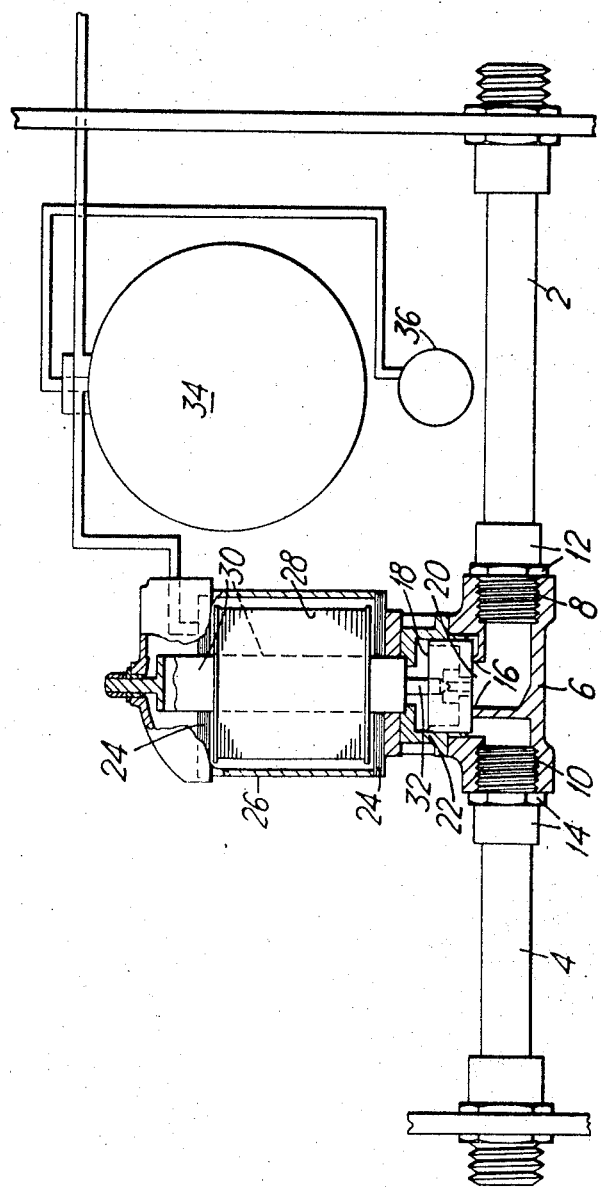

CONTROL APPARATUS FOR AUTOMATIC WATER FLUSHING SYSTEMS

This invention relates to control apparatus for automatic water flushing systems.

Automatic water flushing cisterns are known in which the flushing operation takes place at predetermined intervals without manual intervention, possibly three or four times during each hourly period, although the intervals will obviously vary according to individual requirements or preferences. These automatic cisterns are usually installed in the larger type of building, rather than for domestic use, and in many cases these buildings are only used for a part of the 24 hours of each day; for example in connection with schools, they are unlikely to be used during the night and probably not in the evening. Nevertheless the automatic flushing of the cisterns continues throughout these off periods, and since the installations often embody an appreciable number of cisterns, a very large quantity of water runs to waste. An object of this invention is therefore to avoid this waste of water.

This invention consists in an automatically operated water-flushing installation embodying one or (more usually) a number of flushing cisterns whose flushing action is effected at predetermined intervals, and in combination therewith a control apparatus embodying a timer or programmer which controls the opening and closing of valve means, by which the water supply to the cistern or cisterns will be shut off during such periods of the day or night as will be avoided.

In a preferred arrangement the timer or programmer controls the system by supplying current to a solenoid device which acts to close the valve means, so that the valve remains open and the water supply is not shut off until the solenoid is energized.

The timer or programmer is preferably of the synchronous motor-driven type with a spring reserve which enables it to function for a sufficient period after interruption of the electricity supply.

Advantageously a cabinet or housing is provided in which the valve means and the timer or programmer are mounted, with the necessary water connections through the valve means, so that whole of the control apparatus can be compactly accommodated as a self-contained unit in a suitable position in the building, the cabinet or housing being preferably provided with a lockable cover or door so that access to its interior components cannot be gained by unauthorised persons and the setting of the timer or programmer cannot be interfered with.

The timer or programmer may have the facility for shutting down the installation for longer periods than portions of a 24 hour period, for example it may be convenient to shut it down during week-ends.

The invention provides a compact piece of equipment which can be produced at reasonable cost and readily installed, with very substantial economies in the use of water.

It is an important advantage of the invention that it can be carried into effect without the need for specially designed components; timers or programmers and valves suitable for the purposes of the present invention or which can be readily adapted for the purposes of the present invention are commercially available.

A constructional form of the invention will now be described with reference to the accompanying drawing, which is a side elevation, partly in section, of a control apparatus.

A flow pipe line comprises an arm 2 which receives water from a mains supply and an arm 4 which delivers the water to a system comprising a flushing cistern or a number of flushing cisterns under the control of the apparatus. This apparatus comprises a housing 6 having apertures 8, 10 into which the pipe arms 2, 4 are fitted by means of union fittings 12, 14. The housing 6 incorporates a valve seating 16 on to which a valve 18 can close. The valve however is normally open so that the water can flow from the pipe arm 2 without restriction through the aperture 20 surrounded by the seating and into the pipe arm 4. The valve 18 is mounted in a valve casing 22 attached to the housing 6 and mounted on the casing is a solenoid device comprising laminations 24, cover 26, coil 28, armature 30 and plunger 32, the plunger being connected to the valve 18. The solenoid coil 28 is energised as and when may be predetermined by the setting of a timer or programmer 34 so that the valve 18 is moved to the closed position only so long as the solenoid coil is energized, and is held in the open position at other times by a spring enclosed within the armature. The valve can be designed to operate over a very wide range of water pressures. A tell-tale lamp or neon-type indicator 35 is provided to indicate the condition of the system.

The timer or programmer 34 is preferably of the synchronous motor-driven type with a spring reserve which enables it to function for a period of at least 36 hours after interruption of the electricity supply. When the supply is "on" the mechanism is driven by the mainspring through an escapement and this escapement is synchronously controlled, ensuring absolute accuracy of timekeeping. During supply interruptions the timer or programmer continues to function, being driven by the main-spring controlled by the escapement, until such time as the electricity supply is returned. Once the electricity supply has been returned, the timer or programmer continues as normal and the period when the timer or programmer has been on spring reserve is automatically recharged.

I claim:

1. A water flushing system comprising the combination with an automatic flushing mechanism of a flow pipe interposed between a water supply source and said flushing mechanism, auxiliary control apparatus independent of said automatic flushing mechanism and comprising passage means in said flow pipe through which water must pass on its way to said flushing mechanism, valve means controlling said passage means and normally disposed in a position clear of said passage means to permit flow of water through said passage means, a solenoid device operatively connected with said valve means, and a timing device programming the energization of said solenoid device to close said valve means and shut off the water supply to said flushing mechanism for periods of time determined by the setting of said timing device.

* * * * *